US010917299B2

(12) United States Patent
Bartlett et al.

(10) Patent No.: US 10,917,299 B2
(45) Date of Patent: Feb. 9, 2021

(54) METHOD OF USING A PROXY NETWORK TO NORMALIZE ONLINE CONNECTIONS BY EXECUTING COMPUTER-EXECUTABLE INSTRUCTIONS STORED ON A NON-TRANSITORY COMPUTER-READABLE MEDIUM

(71) Applicant: AAA Internet Publishing Inc., Kelowna (CA)

(72) Inventors: Robert Michael Norman Bartlett, Kelowna (CA); Alexander Edward Needham, Kelowna (CA)

(73) Assignee: AAA INTERNET PUBLISHING INC., Kelowna (CA)

( * ) Notice: Subject to any disclaimer, the term of this patent is extended or adjusted under 35 U.S.C. 154(b) by 0 days.

(21) Appl. No.: 15/335,308

(22) Filed: Oct. 26, 2016

(65) Prior Publication Data
US 2017/0048104 A1  Feb. 16, 2017

Related U.S. Application Data

(63) Continuation-in-part of application No. 15/335,304, filed on Oct. 26, 2016, and a continuation-in-part of
(Continued)

(51) Int. Cl.
*H04L 12/24* (2006.01)
*H04L 12/26* (2006.01)
(Continued)

(52) U.S. Cl.
CPC ........ *H04L 41/083* (2013.01); *H04L 43/0858* (2013.01); *H04L 43/0888* (2013.01);
(Continued)

(58) Field of Classification Search
CPC .............. H04L 41/083; H04L 43/0858; H04L 43/0888; H04L 45/302; H04L 45/306; H04L 67/2804
(Continued)

(56) References Cited

U.S. PATENT DOCUMENTS

| 5,351,239 A | * | 9/1994 | Black | ................... | H04J 3/0626 370/476 |
| 6,215,789 B1 | | 4/2001 | Keenan et al. | | |

(Continued)

OTHER PUBLICATIONS

Office Action issued in U.S. Appl. No. 15/335,304 dated Jan. 9, 2019 [Provided in IFW; Related Application].
(Continued)

*Primary Examiner* — Meng Vang
(74) *Attorney, Agent, or Firm* — Michele V. Frank; Venable LLP

(57) ABSTRACT

A method of using a proxy network to normalize online connections uses a global proxy network (GPN) to manage connections between a plurality of local proxy clients and a destination server. First, an optimization process is executed for the overall network connection between each local proxy client and the destination server. The latency of each optimized connection are then examined to determine a normalization point, which corresponds to the highest latency among the optimized connections. The rest of the connections are then adjusted to conform to the normalization point by adding latency to the connections to match the latency of the normalization point.

11 Claims, 7 Drawing Sheets

Related U.S. Application Data application No. 14/812,968, filed on Jul. 29, 2015, now Pat. No. 9,729,504, application No. 15/335,308, which is a continuation-in-part of application No. 14/731,286, filed on Jun. 4, 2015, now Pat. No. 9,614,870, application No. 15/335,308, which is a continuation-in-part of application No. 14/066,277, filed on Oct. 29, 2013, now Pat. No. 9,571,359, and a continuation-in-part of application No. 14/047,678, filed on Oct. 7, 2013.

(60) Provisional application No. 62/246,397, filed on Oct. 26, 2015, provisional application No. 61/710,026, filed on Oct. 5, 2012, provisional application No. 61/720,232, filed on Oct. 30, 2012, provisional application No. 62/007,787, filed on Jun. 4, 2014, provisional application No. 62/030,384, filed on Jul. 29, 2014, provisional application No. 62/246,304, filed on Oct. 26, 2015.

(51) Int. Cl.
  *H04L 29/08* (2006.01)
  *H04L 12/725* (2013.01)
  *H04L 12/715* (2013.01)

(52) U.S. Cl.
  CPC .......... *H04L 45/302* (2013.01); *H04L 45/306* (2013.01); *H04L 67/2804* (2013.01); *H04L 45/04* (2013.01)

(58) Field of Classification Search
  USPC ........................................................ 709/233
  See application file for complete search history.

(56) References Cited

U.S. PATENT DOCUMENTS

| | | | |
|---|---|---|---|
| 7,609,671 B1 | 10/2009 | Nuriyev et al. | |
| 7,673,056 B1 | 3/2010 | Inbaraj et al. | |
| 7,730,157 B2 | 6/2010 | Baratto et al. | |
| 7,983,148 B1 | 11/2011 | Abramson et al. | |
| 8,589,536 B2 | 11/2013 | Karenos et al. | |
| 9,614,870 B2 | 4/2017 | Bartlett et al. | |
| 2002/0026321 A1* | 2/2002 | Faris | A63F 13/12 705/1.1 |
| 2002/0145974 A1 | 10/2002 | Saidi et al. | |
| 2004/0221296 A1 | 11/2004 | Ogielski et al. | |
| 2005/0055708 A1 | 3/2005 | Gould et al. | |
| 2005/0232193 A1 | 10/2005 | Jorgensen | |
| 2005/0270982 A1 | 12/2005 | McBeath | |
| 2006/0130107 A1* | 6/2006 | Gonder | H04L 29/06027 725/110 |
| 2006/0174160 A1* | 8/2006 | Kim | H04L 29/06027 709/231 |
| 2006/0244818 A1 | 11/2006 | Majors et al. | |
| 2007/0070914 A1* | 3/2007 | Abigail | A63F 13/12 370/252 |
| 2008/0056586 A1 | 3/2008 | Cheng | |
| 2008/0101368 A1 | 5/2008 | Weinman | |
| 2008/0144563 A1 | 6/2008 | Hart | |
| 2008/0293494 A1 | 11/2008 | Adiraju et al. | |
| 2009/0067328 A1 | 3/2009 | Morris et al. | |
| 2009/0282127 A1 | 11/2009 | Leblanc et al. | |
| 2010/0046527 A1* | 2/2010 | Li | H04L 45/00 370/400 |
| 2010/0125851 A1 | 5/2010 | Singh et al. | |
| 2010/0325309 A1 | 12/2010 | Cicic et al. | |
| 2011/0052008 A1 | 3/2011 | Holsing et al. | |
| 2011/0122812 A1* | 5/2011 | Jeong | H04W 36/18 370/328 |
| 2011/0197132 A1 | 8/2011 | Escoda et al. | |
| 2011/0202656 A1 | 8/2011 | Gentile et al. | |
| 2011/0236665 A1 | 9/2011 | Roque et al. | |
| 2011/0296303 A1 | 12/2011 | Duquene et al. | |
| 2012/0190444 A1 | 7/2012 | Fujisawa et al. | |
| 2012/0311107 A1* | 12/2012 | Van der Merwe | H04L 41/083 709/220 |

OTHER PUBLICATIONS

Office Action issued in U.S. Appl. No. 14/047,678 dated Oct. 3, 2018 [Provided in IFW; Related Application].
Advisory Action issued in U.S. Appl. No. 14/047,678 dated Nov. 26, 2018 [Provided in IFW; Related Application].
Advisory Action issued in U.S. Appl. No. 15/335,304 dated Jun. 25, 2018 [Provided in IFW; Related Application].
Office Action issued in related U.S. Appl. No. 14/047,678 dated May 16, 2019 [Available in IFW].
Office Action issued in U.S. Appl. No. 15/335,304 dated Jan. 9, 2019 [Provided in IFW].
Office Action issued in U.S. Appl. No. 14/047,678 dated Oct. 3, 2018 [Provided in IFW].
Advisory Action issued in U.S. Appl. No. 14/047,678 dated Nov. 26, 2018 [Provided in IFW].
Office Action issued in U.S. Appl. No. 15/825,849 dated Aug. 20, 2019 [Provided in IFW].
Advisory Action issued in U.S. Appl. No. 15/335,304 dated Jun. 25, 2018 [Provided in IFW].
Office Action issued in U.S. Appl. No. 15/825,849 dated Feb. 18, 2020 [Provided in IFW].
Office Action issued in U.S. Appl. No. 15/825,849 dated Jul. 6, 2020 [Provided in IFW].
Office Action issued in U.S. Appl. No. 14/047,678 dated May 16, 2019 [Provided in IFW].
Notice of Allowance issued in U.S. Appl. No. 15/335,304 dated Aug. 14, 2019 [Provided in IFW].
Office Action issued in U.S. Appl. No. 14/047,678 dated Nov. 26, 2019 [Provided in IFW].
Office Action issued in U.S. Appl. No. 14/047,678 dated Apr. 20, 2020 [Provided in IFW].

\* cited by examiner

METHOD OF USING A PROXY NETWORK TO NORMALIZE ONLINE CONNECTIONS BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 62/246,304 filed on Oct. 26, 2015.

FIELD OF THE INVENTION

The present invention relates generally to Internet connections. More particularly, the present invention relates to using a proxy network to normalize online connections.

BACKGROUND OF THE INVENTION

Present day, with any website or online service, the service may be accessed by users from all around the world. The challenge that happens with access from users all around the world is that the connectivity of each user will be different. This will result in some users having a connection much stronger or faster than others.

In a competitive situation such as eSports or online gaming, this means that users with a better connection will have an advantage over their opponents. The success of eSports gamers is often dependent on the connection of the gamer, instead of the skill of the gamer. This is a challenge, as the gamers are not competing on a level playing field, especially when the competitors are geographically distributed. When competing for money, having a level playing field is very important for competitive fairness.

Another significant online technology where highly variant connections have a major impact are VOIP or online video communication. With multiple people communicating online, each with different connections, the user experience for each can vary greatly, resulting in unintended interruptions and poor communication. The further away the users are, the more significant the potential problem.

It is therefore an objective of the present invention to introduce a method and system device users can utilize to overcome such problems.

The proposed invention utilizes a global proxy network to help normalize online connections for users connecting to a central server to collaborate or compete. The goal is to provide optimal connections for everyone, but to also artificially slow down connections if necessary so all users are on a level playing field. This will ensure that all users are communicating at the same speed and make collaboration/competing easier.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention. Notably, software solutions may be implemented in a variety of ways while still fulfilling similar functionality.

Figure 1:
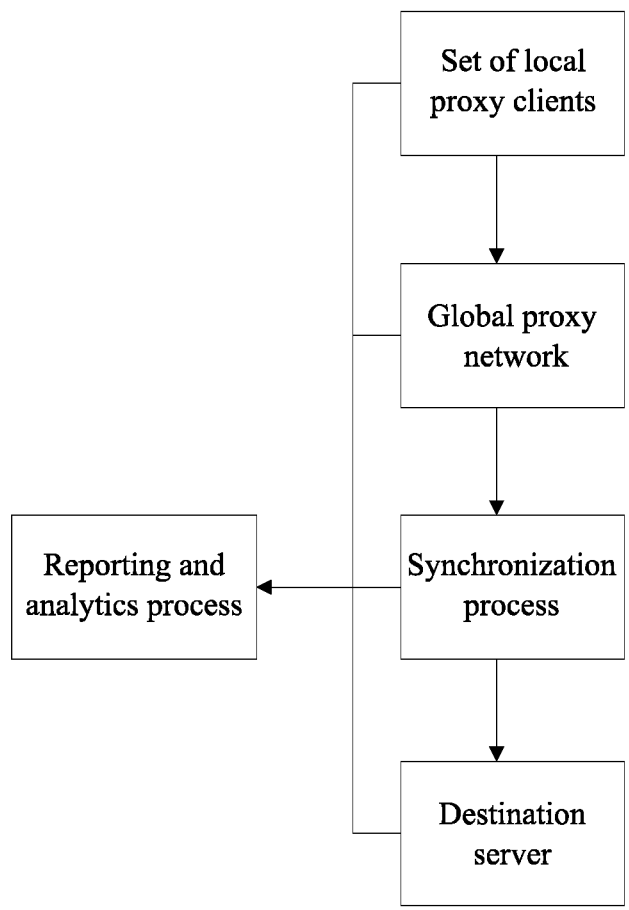
FIG. 1 is a general overview of the functional components of the present invention.
Figure 2:
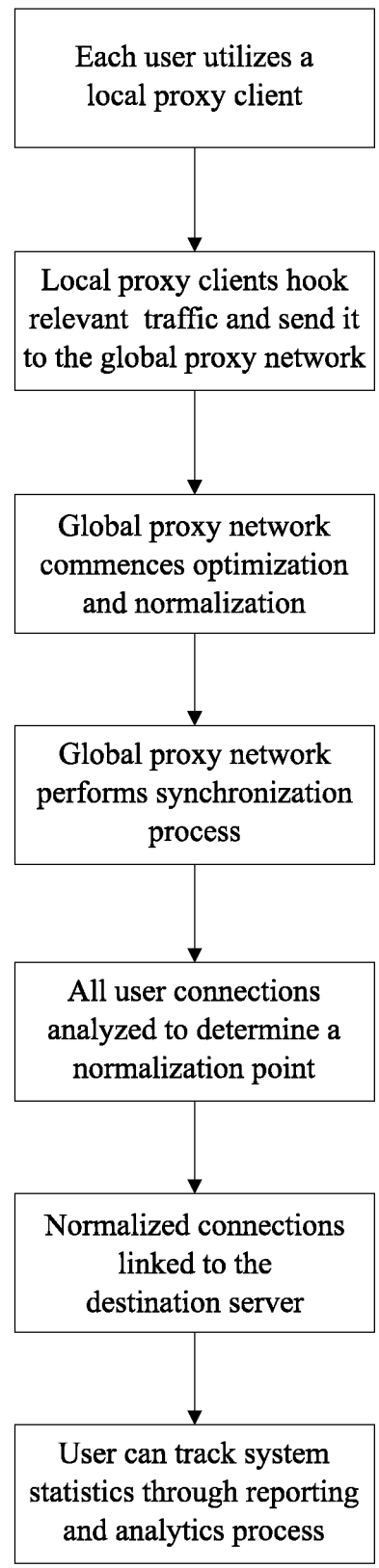
FIG. 2 is a general process overview of the present invention.
Figure 3:
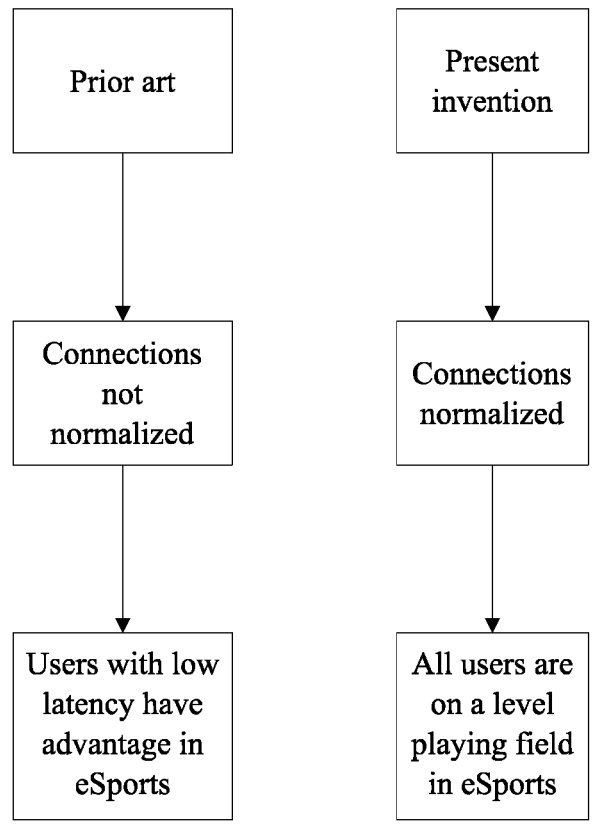
FIG. 3 describes the benefits of the present invention versus the prior art.
Figure 4:
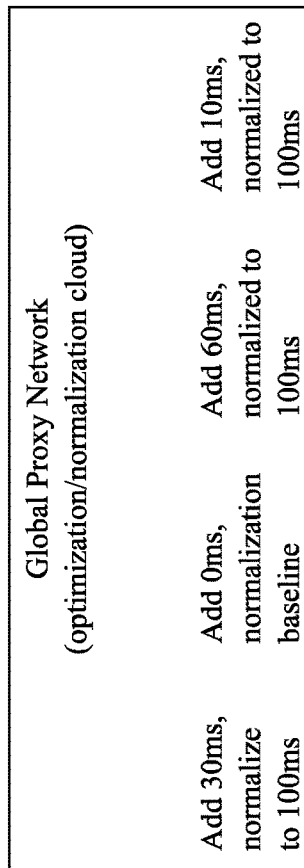
FIG. 4 is a conceptual overview and example of the present invention.
Figure 4:
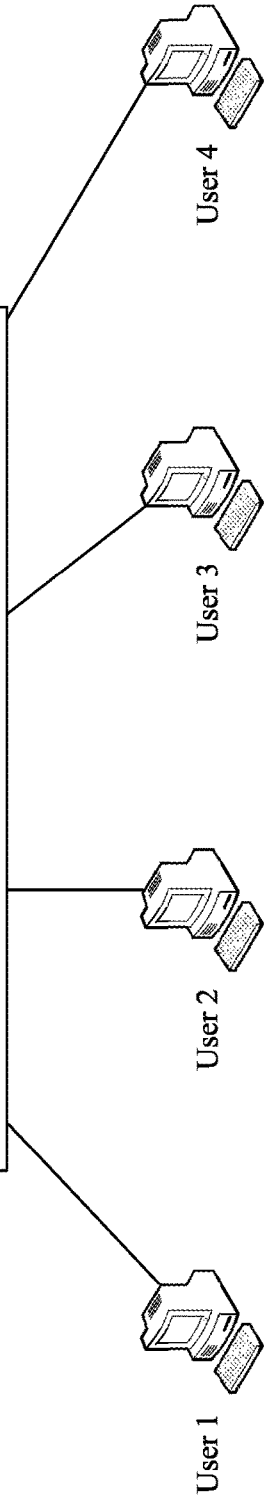
Figure 4:
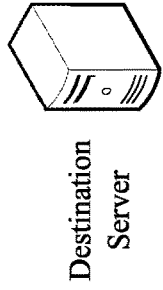

The present invention is a method of using a proxy network to normalize online connections in a group so that all the connections in the group have the same or similar connection speeds. This is particularly applicable for online gaming in order to create a level playing field, where each user has the same connection speed and no one player has a distinct advantage due to having a fast connection in comparison with other players. The general components of the present invention include, but are not limited to: a set of local proxy clients, a global proxy network, a synchronization process, and a reporting and analytics process. FIG. 1 shows a general overview of the present invention. FIG. 2 shows the general process of the present invention. FIG. 3 shows the benefits of the present invention versus the prior art. FIG. 4 shows a conceptual overview and example of the present invention.

Figure 5:
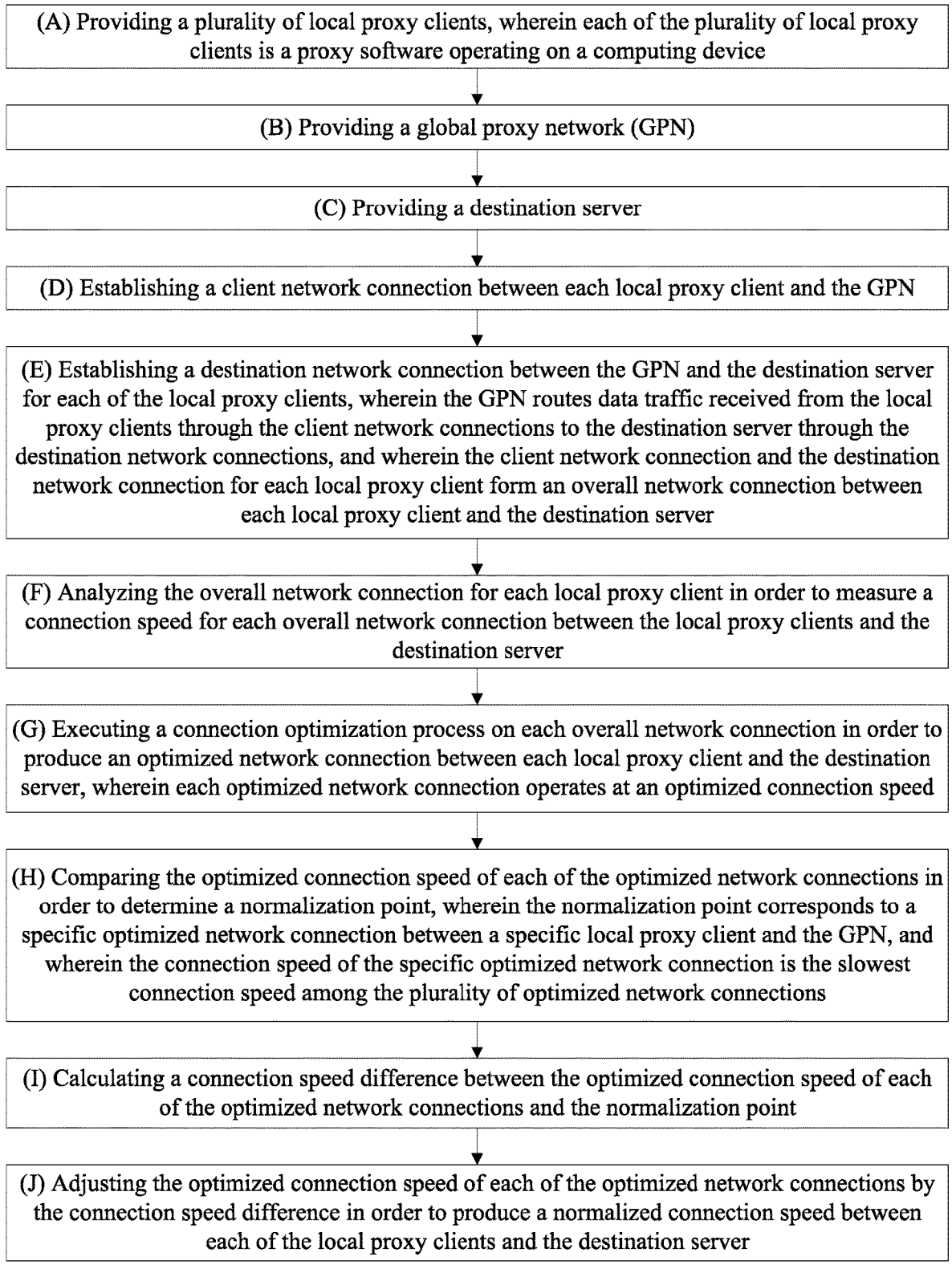
FIG. 5 is a stepwise flow diagram of the steps in the general method of the present invention.

Referring to FIG. 5, in the general method of the present invention, a plurality of local proxy clients is provided (Step A). Each of the plurality of local proxy clients is a proxy software operating on a computing device. The local proxy clients are computer applications through which end users participate in online activities. For example, the local proxy clients are a gaming platform application through which end users play computer games against other end users. This local proxy client will hook relevant traffic and send it to a global proxy network for optimization and normalization. A global proxy network (GPN) is also provided (Step B). The function of the global proxy network is to control the traffic from end-to-end, ensuring optimal connections with minimum latency and low anomalies. The global proxy network does this by performing the synchronization process. A destination server is also provided (Step C). The destination server, or destination IP address is the server or IP address the end user ultimately wishes to electronically communicate with through the local proxy client. For example, the destination server may be a video game server that controls and manages online gaming events among multiple end users, or the destination server may be a server that facilitates electronic collaboration among multiple computing devices.

Initially, a client network connection is established between each local proxy client and the GPN (Step D). Next, a destination network connection is established between the GPN and the destination server for each of the local proxy clients (Step E). The GPN routes data traffic received from the local proxy clients through the client network connections to the destination server through the destination network connections. For each local proxy client, the client network connection and the destination network connection form an overall network connection between the local proxy client and the destination server. Each local proxy client is associated with at least one client network connection and at least one destination network connection in order to form an overall network connection.

Once the overall network connection is established, the overall network connection is analyzed for each local proxy client in order to measure a connection speed for each overall network connection between the local proxy clients and the destination server (Step F). Then, a connection optimization process is executed through the GPN on each overall network connection in order to produce an optimized network connection between each local proxy client and the destination server, so that each optimized network connection now operates at an optimized connection speed (Step G). It should be understood that the optimization process may be any relevant process for optimizing network connections, and is not the focus of the present invention and therefore not disclosed herein.

Once the optimization process is complete, the optimized connection speed of each of the optimized network connections is compared in order to determine a normalization point (Step H). The normalization point corresponds to a specific optimized network connection between a specific local proxy client and the GPN, and the connection speed of the specific optimized network connection is the slowest connection speed among the plurality of optimized network connections.

The main goal of the present invention is to ensure that all connections have the fastest speed possible while maintaining conformity among the connections, so in general each connection is normalized by being slowed to the speed of the slowest connection. High ping connections will be reduced as much as possible with the proxy network, while low ping connections may be artificially increased with the proxy network. A connection speed difference is calculated between the optimized connection speed of each of the optimized network connections and the normalization point (Step I). Finally, the optimized connection speed of each of the optimized network connections is adjusted by the connection speed difference in order to produce a normalized connection speed between each of the local proxy clients and the destination server (Step J).

Figure 6:
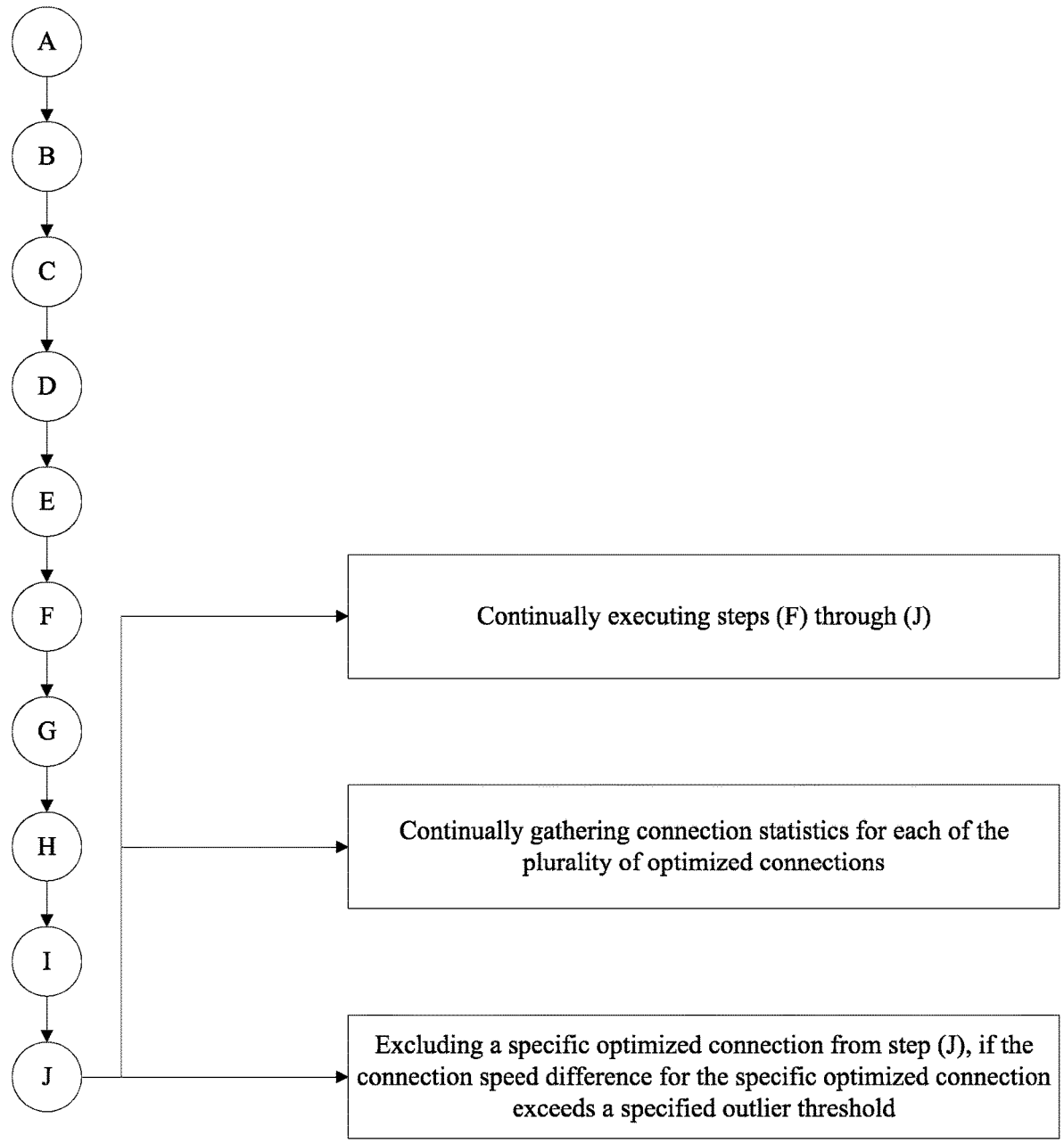
FIG. 6 is a stepwise flow diagram depicting further ancillary steps in the method of the present invention.

Referring to FIG. 6, in one embodiment, steps F through J are continually executed in order to maintain a consistent normalization point and mitigate connection fluctuations. In one embodiment, a specific optimized connection may be excluded from step J, if the connection speed difference for the specific optimized connection exceeds a specified outlier threshold. If one of the connections is extremely slow, normalizing all the other connections to the extremely slow speed would be very detrimental to the group of connections as a whole.

Figure 7:
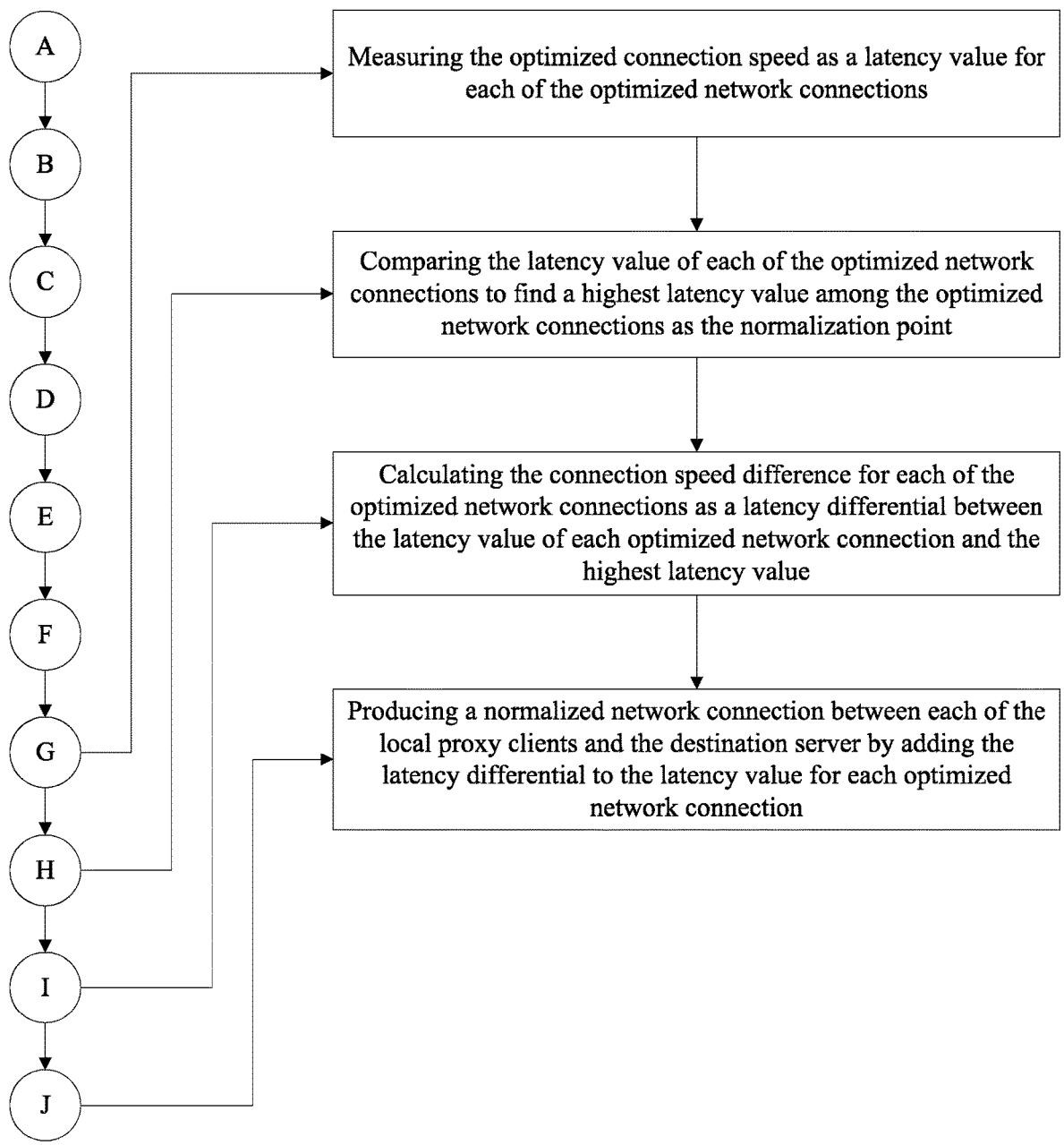
FIG. 7 is a stepwise flow diagram depicting steps for normalizing connection speeds based on latency.

Referring to FIG. 7, in one embodiment of the present invention, a latency value is measured as the optimized connection speed for each of the optimized network connections. In other embodiments, other metrics may be utilized as the optimized connections speed, such as, but not limited to, ping, bandwidth, throughput, uptime, or other metrics, alternatively or in addition to latency. The latency value of each of the optimized network connections is compared to find a highest latency value among the latency values of the optimized network connections as the normalization point. The connection speed difference is calculated for each of the optimized network connections as a latency differential between the latency value of each optimized network connection and the highest latency value. A normalized network connection is then produced between each of the local proxy clients and the destination server by adding the latency differential to the latency value for each optimized network connection.

An example of the synchronization process in a hypothetical situation with four users, described as follows. The example utilizes User 1 numbered through User 4. The example is illustrated in FIG. 4.

User 1 has a Normal Latency of 100 ms, and a GPN Optimized Latency of 70 ms.

User 2 has a Normal Latency of 200 ms, and a GPN Optimized Latency of 100 ms.

User 3 has a Normal Latency of 50 ms, and a GPN Optimized Latency of 40 ms.

User 4 has a Normal Latency of 150 ms, and a GPN Optimized Latency of 90 ms.

Notably, User 2 is used for the normalization baseline because they have the highest latency.

The global proxy network will aim to adjust the latency for all users so they match the lowest possible latency score for User 2. In this example, all users will be normalized to 100 ms, described as follows:

User 1 has 30 ms added to their latency.

User 2 has 0 ms added, because they are the normalization point in this example.

User 3 has 60 ms added to their latency.

User 4 has 10 ms added to their latency.

After all connections are normalized, the global proxy network sends the data onto the destination server. All four users have been normalized to a 100 ms connection to the destination server. This creates a level playing field for all users, without any one user having an unfair latency advantage. This would be vital in an eSports situation.

It is important to mention that one of the key differentiators between the present invention and the prior art, is that the present invention utilizes a third-party proxy network for optimizing and normalizing middle mile connections for any Internet technology. This is the aforementioned global proxy network.

Unlike the prior art, the present invention does not require collaboration with any service provider. The present invention is versatile and is capable of performing on a wide variety of services. Because the present invention optimizes the middle mile, the present invention's system also gives much greater control over the connection for all users, to ensure they are optimal, so less normalization is required.

This prior art requires a client/server solution, and the prior art can only normalize at the local server level, or at the local client level. The prior art provides no connection optimization, and therefore has to make much larger changes in order for the normalization to happen. Additionally, the connections will never be smooth, as it will always be polluted with flux, spikes, and loss in the middle mile.

The present invention's system is advantageous over the prior art, as it does not require collaboration with a service provider. The present invention optimizes the middle mile using a global proxy network, minimizing flux, spikes, loss and the average latency for all device connections. As a result, the normalization required for all connected devices with our system is far less than this prior art.

The preferred embodiment of the present invention further comprises a reporting and analytics process. This process, while desired, is optional in the present invention's overall system. In alternative or future embodiments of the invention, a report and ongoing connection statistics process may be provided. This process will show the normalization impact on all the user connections, and to confirm that all the user connections have in fact been normalized. Connection statistics are continually gathered for each of the plurality of optimized network connections.

In alternative or future embodiments of the invention additional statistics types not explicitly mentioned here may be tracked as well. Additionally, in alternative or future embodiments of the invention, the ability to export statistics and analytics to industry-standard or custom file formats may be included as well.

Herein follows a summary overview of the present invention's process, while describing the interaction of the major components and processes. Some of these descriptions may be redundant with preceding material; however, they are included in order of occurrence for the sake of clarity.

First, each user will use a local proxy client, which will hook relevant traffic and send it to a global proxy network for optimization and normalization. The plurality of local proxy clients forms the set of local proxy clients in the present invention.

The next step in the process takes place at the global proxy network. The global proxy network will control the traffic from end to end, ensuring optimal connections with minimum ping, maximal speed and low anomalies.

Next is the synchronization phase. Each user collaborating online will be involved in a brief syncing phase. A normalization point is determined for all connections.

The reporting and analytics process allows users to keep track of ongoing connections and related statistics. It will also allow users to confirm that all the user connections have been normalized.

Although the invention has been explained in relation to its preferred embodiment, it is to be understood that many other possible modifications and variations can be made without departing from the spirit and scope of the invention as hereinafter claimed.

What is claimed is:

1. A method of using a global network to normalize online connections by executing computer-executable instructions stored on a non-transitory computer-readable medium comprises the steps of:
    establishing a client network connection between a plurality of local clients and the global network;
    establishing a destination network connection between the global network and a destination server for each of the local clients, wherein the global network is configured to route data traffic received from each of the local clients through the client network connection to the destination server through the destination network connection, and wherein the client network connection and the destination network connection for each local client form an overall network connection having a first network connection speed between each local client and the destination server;
    analyzing the overall network connection for each local client in order to measure the first network connection speed for each overall network connection between each local client and the destination server;
    executing a connection optimization process by the global network on each overall network connection having the measured first network connection speed by controlling network traffic from end-to-end and rerouting data traffic to provide optimal overall network connection with minimum latency in order to produce an optimized network connection having an optimized network connection speed between each local client and the destination server,
    wherein each optimized network connection is configured to operate at a second network connection speed,
    wherein the second network connection speed after said executing the connection optimization process is greater than the measured first network connection speed;
    comparing the optimized network connection speed of each of the optimized network connections in order to determine a slowest optimized network connection speed of the optimized network connections, wherein the slowest optimized network connection speed of the optimized network connections is determined to be a normalization point;
    calculating a connection speed difference between the optimized network connection speed of each of the optimized network connections and the normalization point; and
    adjusting the optimized network connection speed of each of the optimized network connections by the network connection speed difference with the global network in order to produce a normalized network connection speed between each of the local clients and the destination server,
    wherein said executing the connection optimization process is prior to comparing the optimized network connection speed of each of the optimized network connections in order to maximize the normalization point.

2. The method of claim 1, wherein the comparing the optimized connection speed of each of the optimized network connections in order to determine the slowest optimized connection speed of the optimized network connections comprises:
    measuring the optimized connection speed as a latency value for each of the optimized network connections; and
    comparing the latency value of each of the optimized network connections to find a highest latency value among the optimized network connections as the normalization point.

3. The method of claim 1, wherein the calculating the connection speed difference between the optimized connection speed of each of the optimized network connections and the normalization point comprises:
    calculating the connection speed difference for each of the optimized network connections as a latency differential between the latency value of each optimized network connection and the highest latency value.

4. The method of claim 1, further comprising:
    continually gathering connection statistics for each of the plurality of optimized connections.

5. The method of claim 1, further comprising:
    excluding a specific optimized connection from adjusting the optimized connection speed of each of the optimized network connections by the connection speed difference with the global network, if the connection speed difference for the specific optimized connection exceeds a specified outlier threshold.

6. The method of claim 1, wherein the connection optimization process increases the connection speed of at least one overall network connection.

7. The method of claim 1, wherein the global network is a global proxy network, and wherein the local clients are local proxy clients.

8. The method of claim 1, wherein the global network is between the local clients and the destination server such that it controls data transmitted from the local clients to the destination server.

9. The method of claim 1, wherein each of comparing the optimized connection speed, calculating the connection speed difference, and adjusting the optimized connection speed is performed by the global network.

10. The method of claim 1, wherein the global network is a third-party network external to the destination server.

11. The method according to claim 1, wherein adjusting the optimized connection speed of each of the optimized network connections by the connection speed difference comprises reducing the optimized connection speed of each of the optimized network connections by the connection difference.

* * * * *